United States Patent [19]

Yancey

[11] 4,041,257

[45] Aug. 9, 1977

[54] CROSS CONNECT PANEL FOR LIGHTING SYSTEMS

[76] Inventor: LeRoy D. Yancey, 1834 S. Oakmont Drive, Bountiful, Utah 84010

[21] Appl. No.: 669,882

[22] Filed: Mar. 24, 1976

[51] Int. Cl.[2] .......................... H01H 9/00; H02B 1/04

[52] U.S. Cl. ................................ 200/1 R; 200/16 R; 200/16 C; 361/341; 361/350; 361/355

[58] Field of Search .................... 200/1 R, 5 R, 16 R, 200/16 C, 16 D, 17 R, 18; 317/112, 119; 361/353, 425

[56] References Cited

U.S. PATENT DOCUMENTS

| | | | |
|---|---|---|---|
| 2,796,473 | 6/1957 | Davis | 200/16 C |
| 3,467,922 | 9/1969 | Greenwall, Jr. et al. | 200/16 C X |
| 3,496,421 | 2/1970 | Greenwall, Jr. | 317/112 |
| 3,603,747 | 9/1971 | Davis | 200/16 C X |
| 3,652,813 | 3/1972 | Davis | 317/112 X |
| 3,670,117 | 6/1972 | Yancey | 200/16 C |
| Re. 24,586 | 1/1959 | Davis | 200/16 C |
| Re. 28,134 | 8/1974 | Davis | 200/1 R |

FOREIGN PATENT DOCUMENTS

| | | | |
|---|---|---|---|
| 887,275 | 11/1971 | Canada | 200/16 C |

*Primary Examiner*—James R. Scott
*Attorney, Agent, or Firm*—Trask & Britt

[57] ABSTRACT

A cross connect panel includes a base supply section and a plurality of load-connector modules mounted transverse the base supply section. The base supply section comprises a plurality of bus bars arranged side-by-side in spaced, parallel, mutually insulated relationship within a channel formed by approximately parallel side support members. Each of the transverse modules includes one or more slider assemblies adapted to interconnect, through electrical contacts, a bus bar with an external load. The length of the base section is determined solely by the number of transverse modules desired in the system and the length of the transverse modules is determined by the number of supply bus bars included in the system. The slider assemblies are self-contained, and when mounted, are captive in vertical, horizontal and lateral directions. Moreover, these assemblies are capable of effecting an "off" mode at any transverse location with respect to the bus bars. A large thin load conductor surface and multiple break points for the current path within the modules provide many electrical advantages and avoid arcing at the bus bars.

27 Claims, 11 Drawing Figures

CROSS CONNECT PANEL FOR LIGHTING SYSTEMS

BACKGROUND OF THE INVENTION

1. Field

This invention relates to theater lighting systems and provides an improved cross connect panel for such systems.

2. State of the Art

A variety of cordless electric cross connect panels are in use for theater lighting systems. These panels are sometimes referred to within the art as "patch panels," and include a multiplicity of bus bars running substantially parallel to each other and connected to either the power supply or load side of a theater lighting circuit. Cross connect devices of some types are mounted transverse the bus bars and are themselves connected to either the load or power supply side of the circuit opposite the side connected to the bus bars. The cross connect devices are adapted to selectively interconnect a load with a power supply, often in association with circuit breaker means.

Cross connect panels which have gained acceptance commercially are disclosed and claimed in U.S. Pat. Nos. 2,796,473; Re 24,586; 3,467,922; 3,496,421; 3,603,747; and Re 28,134. Although the devices illustrated by these patents have enjoyed considerable commercial success, they nevertheless retain certain limitations and disadvantages from both mechanical and operational standpoints. For example, it is desirable for a cross connect panel to have the capability of expansion both in the number of power supplies and in the number of load circuits which can be accommodated. The panels of the prior art are limited in this respect. Moreover, inordinate care must be taken in operating many of the devices of the prior art because they are incapable of "breaking" a circuit without relocating the cross connect device to a special, reserved "off" transverse position with respect to the bus bars. Expanding the capacity of prior art patch panels by incorporating additional cross connect devices involves skilled disassembly and assembly techniques and sacrifices the structural integrity of the system. The cross connect panels currently in use also return the problem—common to switching apparatus—of concentrated arcing and the attendent difficulties of erosion of point contacts.

The foregoing are illustrative only of the problems associated with cross connect panels of the prior art. In general, it may be stated that a great many structural and electrical inconveniences are accepted by the industry because of the usefulness of cross connect systems as compared to alternative approaches to theater lighting and the absence of more acceptable alternatives.

SUMMARY OF THE INVENTION

The present invention provides a cross connect panel of improved construction which avoids many of the problems of the prior art and provides several significant electrical and mechanical advantages. The cross connect panel of this invention includes a base supply section of improved construction as well as a self-contained cross connect module of novel design. Although it is technically feasible to associate individual bus bars of the base section with load circuits, such an arrangement would be rare in practice. Accordingly, throughout this disclosure, the base section will be regarded as the "supply" portion of the system and cross connect modules will be regarded as the "load" portion of the system. The cross connect module incorporates improved slider assemblies corresponding with the cross connect devices of the prior art, and may be specially adapted to incorporate unique indexing and coding mechanisms to correlate the available supply circuits with the load circuits of the lighting system under control. Each slider assembly includes multiple contact breaks in the current path to avoid arcing at the bus when a slider assembly is relocated transverse the bus bars of the base section.

The base supply section of the claimed device includes a pair of relatively rigid, spaced side support members which cooperatively form a channel or slot to retain interleaved bus bars and insulating strips in parallel relationship. Because of the unique construction of the overall device, which will be explained in detail hereinafter, the bus bars may be of any desired practical length. The determining factor in selecting bus bar length is the number of cross connect modules desired for the lighting system, rather than structural considerations. Moreover, the base section may contain virtually as many bus bars as may be desired (typically one per supply circuit). The determining factors in selecting the number of bus bars to be included in the system are again unrelated to the structural considerations imposed by the prior art devices. The virtual necessity inherent in the prior art devices that the bus bars be tightly clamped to or imbedded in adjoining insulating material is also avoided by the claimed structure. Thus, although the bus bar section may be assembled with transverse bolts or pins in the fashion suggested by U.S. Pat. Re. No. 28,134, it is neither necessary nor particularly desirable that the bus bars and insulating strips of the present structure be pressed together as taught by that patent. Although means are provided for restraining the bus bars from moving either longitudinally or vertically in the channel, and they are restrained from transverse movement by adjacent insulating strips, the bus bars themselves may be loosely inserted between the insulating strips.

The side support members not only contain the interleaved bus bars and insulating strips, but also function as support beams for as many transverse, cross connect modules as may be included in the system. Each such module ties the side support members together so that increasing their numbers actually contributes to the overall structural rigidity of the system. Any given cross connect module may be removed or exchanged without disturbing adjacent modules. The side support members may take various forms but are ideally of uniform cross sectional configuration along their lengths so that they may be formed as extruded shapes. Generally, each side support member will include a bottom element, an upstanding inner side wall (to form one side of the bus bar — containing channel), and an elevated support surface. The support surface extends out from and normal the inner side wall, providing a platform for supporting various structures. A portion of this platform may be configurated as an indexing surface for the cross connect modules. Other portions of the platform are adapted as anchoring points for the cross connect modules and any other structural components desired, for example, external circuit breakers associated with individual load circuits.

Means are provided in association with each bus bar for electrical connection to bus terminals remote from the bus bars. These terminals are generally most conveniently mounted in an array at one or opposite terminations of the bus bar channel of the base supply section. The array of bus bar terminals may be anchored to the base supply section, e.g., to the side support members. According to certain preferred embodiments, however, the bus bar terminals are suspended from slugs adapted for removable insertion (e.g., a swaged fit) in a retaining space provided at one end of each bus bar.

The cross connect modules of this invention are especially advantageous. Although all of the components may be standard and completely interchangeable, the modules may be constructed in any chosen length by merely selecting an appropriate length for the transverse structural components (those which are transverse the bus bars when the module is installed). These components are conveniently either lengths of extruded stock or strips of sheet material. Accordingly, increasing the span of the module to accommodate a greater number of bus bars is limited by neither structural nor economic considerations.

The structural support system for each module includes a non-conductive center support member of relatively large width and length dimensions and thin cross section. This center support member is structured as a thin panel held transverse and upstanding from the bus bars within a structural frame including a pair of end supports adapted for connection to respective side support members of the base section. The end supports and the center support interlock with a head frame member and a bottom frame member to form a rigid support system of any convenient lengths selected to span the bus bars of the supply section. Thin metallic strips adhering to each side of the upstanding panel (center support member) serve as load (or in rare instances, supply) conductors. These strips may be selectively placed in circuit with any of the bus bars through slider assemblies mounted to travel on the transverse frame members (head frame and/or bottom frame) of the cross connect modules. Means are also provided to connect each said load conductor with an output terminal of some type, typically a conventional circuit breaker or load device.

Ideally, the head frame and base frame members include rails or tracks adapted to corresponding structures associated with the slider assemblies, so that when a module is assembled, a slider assembly is fastened on each side of the central support member. Each slider assembly is free to move transversely (parallel and adjacent the center support) but is otherwise fixed in its vertical and lateral directions of travel. In the preferred form of the invention, the slider assemblies are self-contained, and an entire cross connect module, including a pair of preassembled slider assemblies, can be quickly assembled by interlocking the structural components. The side supports may then be pinned or otherwise fastened to the center support panel. With the end supports thus fixed, the entire module is locked together and forms a rigid structural member. The assembled module may then be positioned transverse the base supply section, and the end supports anchored to the side support members of the base section. Removal and disassembly of a module for purposes of maintenance, replacement or repair is thus a simple matter, and can be accomplished without interference to adjacent modules or the remainder of the system.

The preferred slider assemblies associated with the cross connect modules might more properly be termed sliding brush assemblies. The thin metallic load conductors (preferably of metal cladding) carried by the center support panel of the module provide a large surface area and thin cross section for maximum current-carrying capacity and heat dissipation. The slider assembly preferably is structured to house brush contacts which remain in contact with the load conductor at all times that a current path exists between the bus bars and load conductors. Similarly, a bus bar contact (main breaker contact) carried by the sliding brush assembly maintains physical contact with a bus bar at all times such a current path exists. Secondary contact points are provided between the main and the brushes to make after and break before the brushes and main make and break, respectively, with the load and source conductors, respectively. All significant arcing thus occurs at the secondary contacts. These contacts are structured to ensure that arcing occurs over a large surface area. Preferably the secondary contacts are structured so that the arced surfaces are mechanically wiped each time arcing occurs.

An important aspect of this invention is the improved indexing of the load circuit (individual slider assembly) with a specific bus bar. The slider assemblies may carry an indexing plunger in association with the main contact to index directly the desired bus. Moreover, the head frame support and the slider assembly may be cooperatively adapted with indicia means to precisely indicate the bus location sensed by the indexing plunger.

Another advantage which is offered by the slider assemblies of this invention is provision of an "off" electrical mode without regard to the transverse location of the main contact. That is, the current path may be broken by activating the secondary contacts carried by the sliding brush assembly independent of transverse movement of the assembly itself. This capability is believed to be unique in cross connect equipment. A circuit may be broken in this fashion while retaining (or relocating) the main contact in a desired indexed position.

BRIEF DESCRIPTION OF THE DRAWINGS

In the drawings, which illustrate what is presently regarded as the best mode for carrying out the invention.

DESCRIPTION OF THE ILLUSTRATED EMBODIMENT

Figure 1:
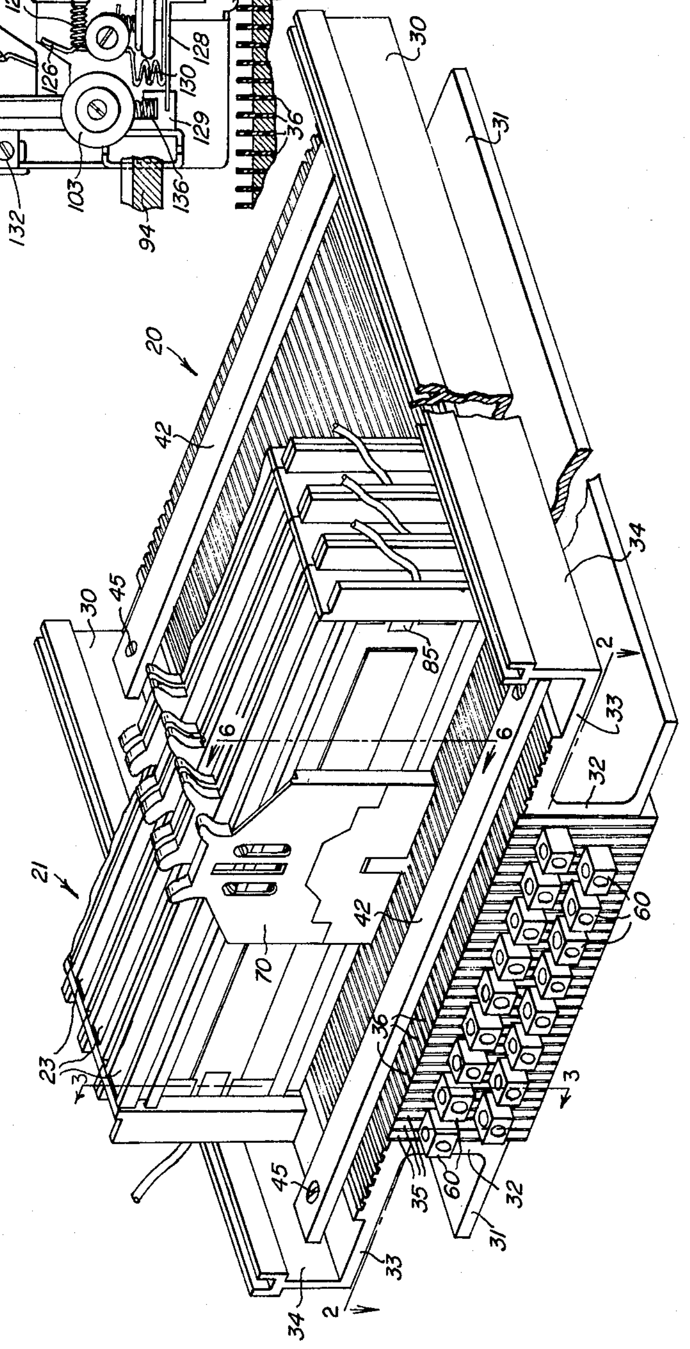
FIG. 1 is a fragmentary view in perspective showing the major components of one form of the invention in assembled condition.

The cross connect panel (or patch panel) illustrated by FIG. 1 includes a base supply section 20 and a cross-connecting load section 21. The load section 21 is comprised of a plurality of load-connecting modules 23 mounted in approximately parallel, side-by-side relationship transverse the base supply section 20.

Figure 3:
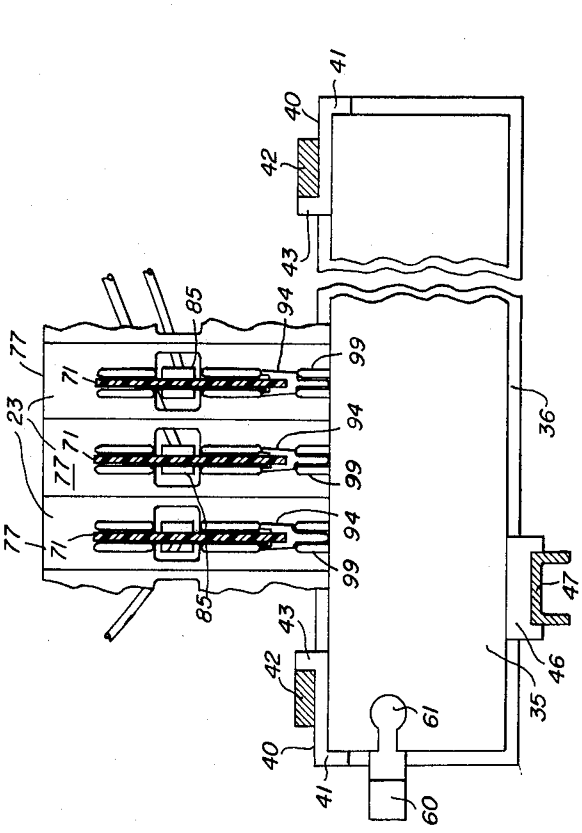
FIG. 3 is a view in cross section taken along the reference plan represented by the line 3—of FIGS. 1 and 2, looking in the direction indicated by the arrows and illustrating bus bar-retaining structure.
Figure 2:
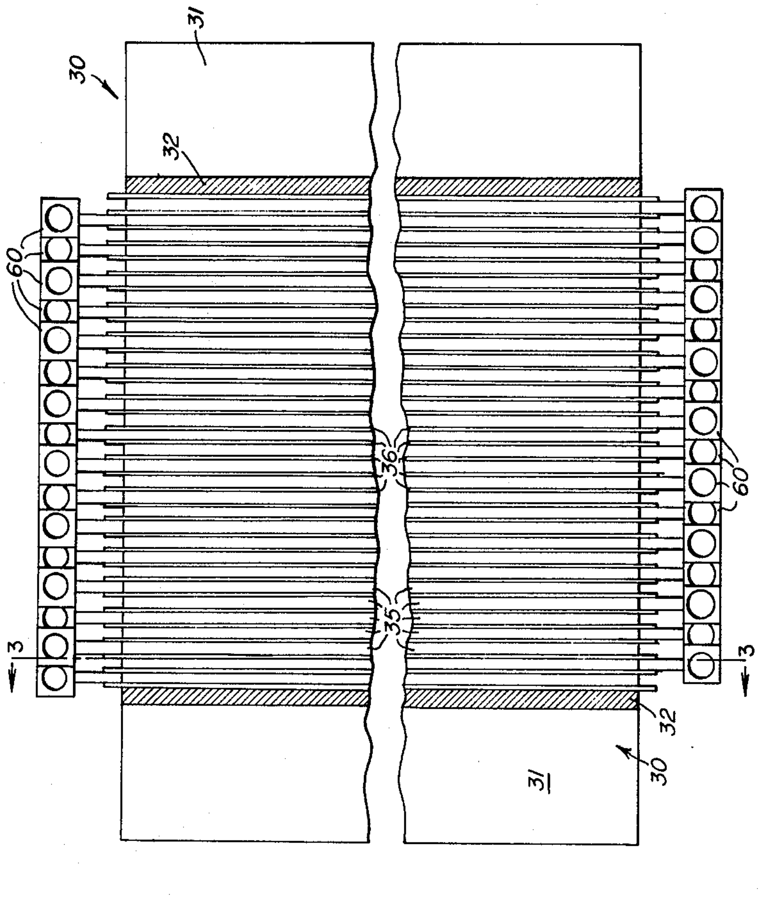
FIG. 2 is a view in cross section taken along the reference plane represented by the line 2—2 of FIG. 1 and looking in the direction indicated by the arrows.

Assembly of the base supply section 20 is best shown by FIGS. 2 and 3 in conjunction with FIG. 1. This section may be regarded as being assembled with reference to a pair of approximately parallel, side support members 30, each including a bottom element 31, an inner side wall 32 upstanding from the bottom element 31, an elevated support element 33, extending approximately normal the wall 32 and outward (that is, away from the other side support member 30), and an outer side wall 34 upstanding from the elevated support element 33. The side support members 30 are spaced to form a channel between their respective inner side walls 32.

A plurality of bus bars 35 are arranged in approximately parallel, spaced relationship within, and in approximately longitudinal alignment with the channel defined by the inner side walls 32. A plurality of insulating strips 36 are interleaved with the bus bars 35 so that individual bus bars 35 are "sandwiched" between insulating strips 36. Thus, the bus bars 35 are electrically insulated from each other and the side support members 30.

Structural means are provided to restrain the individual bus bars from movement within the channel. FIG. 3 best illustrates an arrangement whereby a pair of restraining locks 40 are positioned with depending legs 41 restraining longitudinal movement of an individual bus bar 35. An upper clamp member 42 bears directly atop the lock 40 and rests across the tops of the insulating strips 36 (see FIG. 1), being secured, e.g., by screws 45 (FIG. 1), to the elevated support members 33. Upstanding legs 43 of the locks 40 are retained in proper position by the upper clamp member 42. The bottom of each bus bar 35 rests on an insulating mounting pad 46 which in turn is supported by a lower clamp member 47. The lower clamp member 47 may be bolted to the base or bottom elements 31 of the side supports 30 or otherwise secured to press each bus bar 35 between the restraining locks 40 and mounting pads 46 located at each of its ends.

Figure 4:
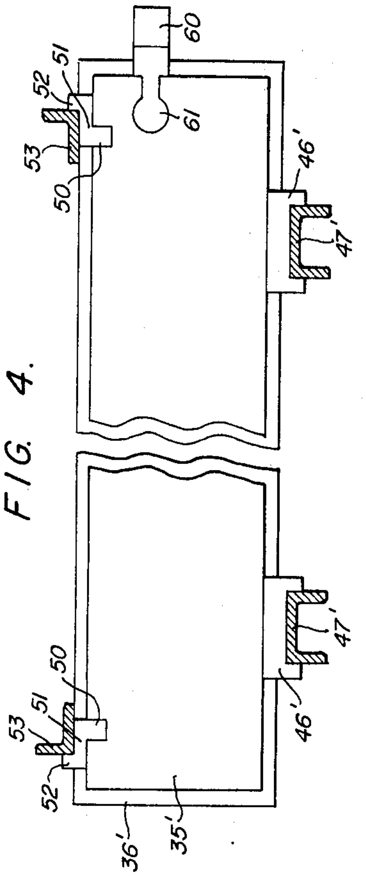
FIG. 4 is a fragmentary view in side elevation illustrating alternative bus bar-retaining structure.

FIG. 4 illustrates alternative bus bar-restraining means wherein the bus bars 35', insulating strips 36', insulating bottom mounting pads 46' and lower clamp member 47' are similar to the corresponding components shown in FIGS. 1, 2 and 3. The bus bars 35' are notched as shown, however, to receive depending legs 50 of insulated retaining locks 51. Upstanding legs 52 are held by the upper clamp member 53 which may be of any desired structural material, without regard to its conductive properties.

Bus terminals 60 are electrically connected to the individual bus bars 35, and are desirably mounted as shown in the proximity of the base supply section 20. In the illustrated instance, the terminals 60 associated with adjacent bus bars 35 are mounted at opposite ends of the base supply section 20 (see FIG. 2). Additionally, as best seen from FIG. 1, adjacent bus terminals 60 may be staggered in elevation to provide working space for making connections. Although the bus terminals 60 may be associated with the base supply section 20 by various wiring and mounting arrangements, a preferred approach is that illustrated by FIGS. 3 and 4 wherein each bus terminal 60 is integral with a swage fit terminal extension 61 adapted for insertion into a suitable receptacle (e.g., a punching) provided in the bus bar 35, 35'. This arrangement provides positive electrical and mechanical coupling of the terminal 60 and bus bar 35, contributing to the ease of assembly of the base supply section 20.

Figure 9:
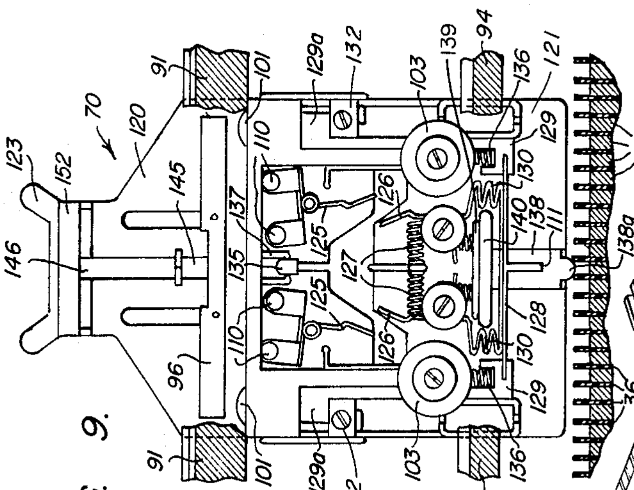
FIG. 9 is a view similar to FIG. 8 showing the sliding brush assembly in its mechanically fully open mode.
Figure 5:
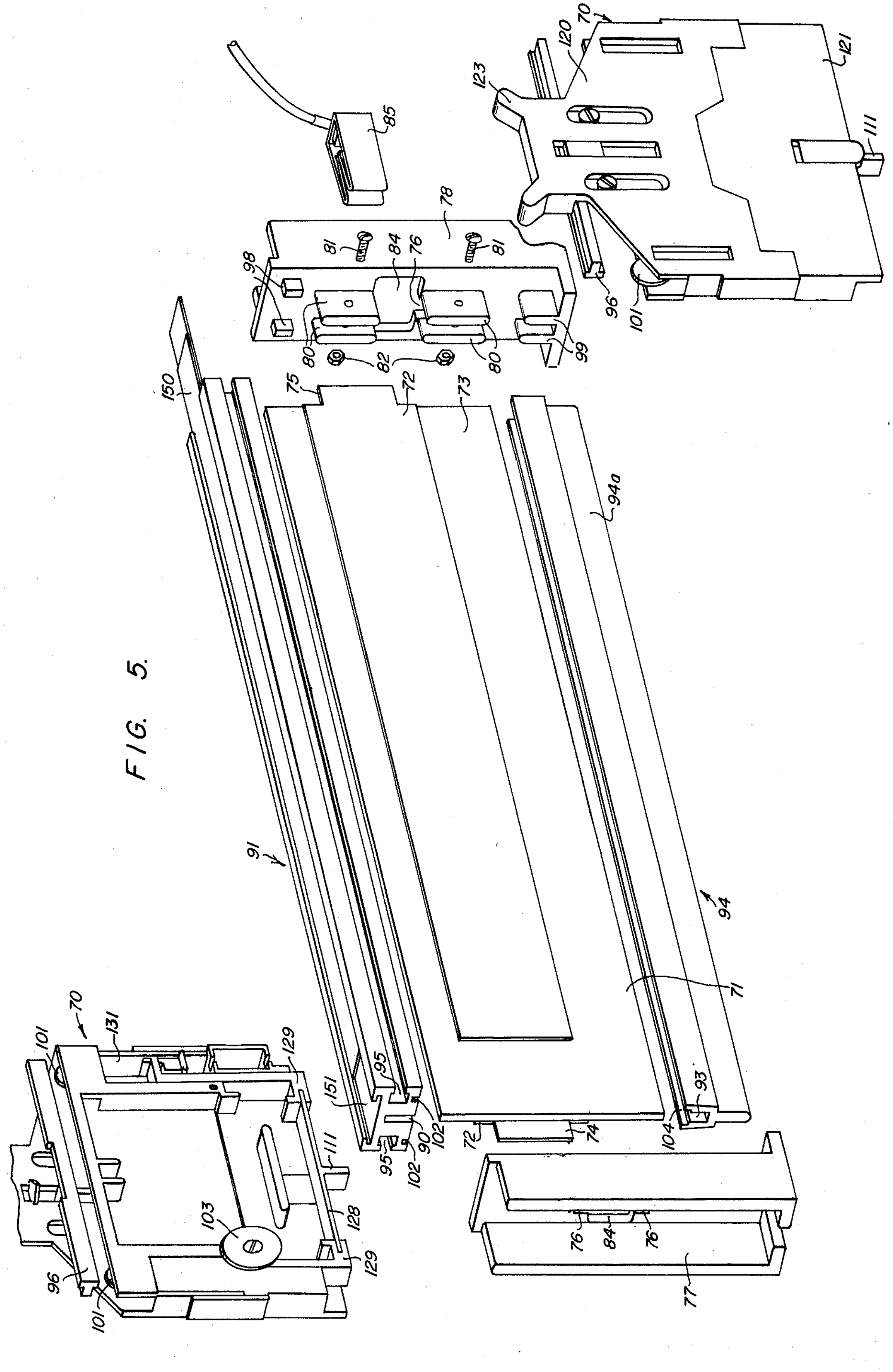
FIG. 5 is an exploded view in perspective illustrating the basic structural components of a preferred cross connect module of this invention.
Figures 6, 7, 8:
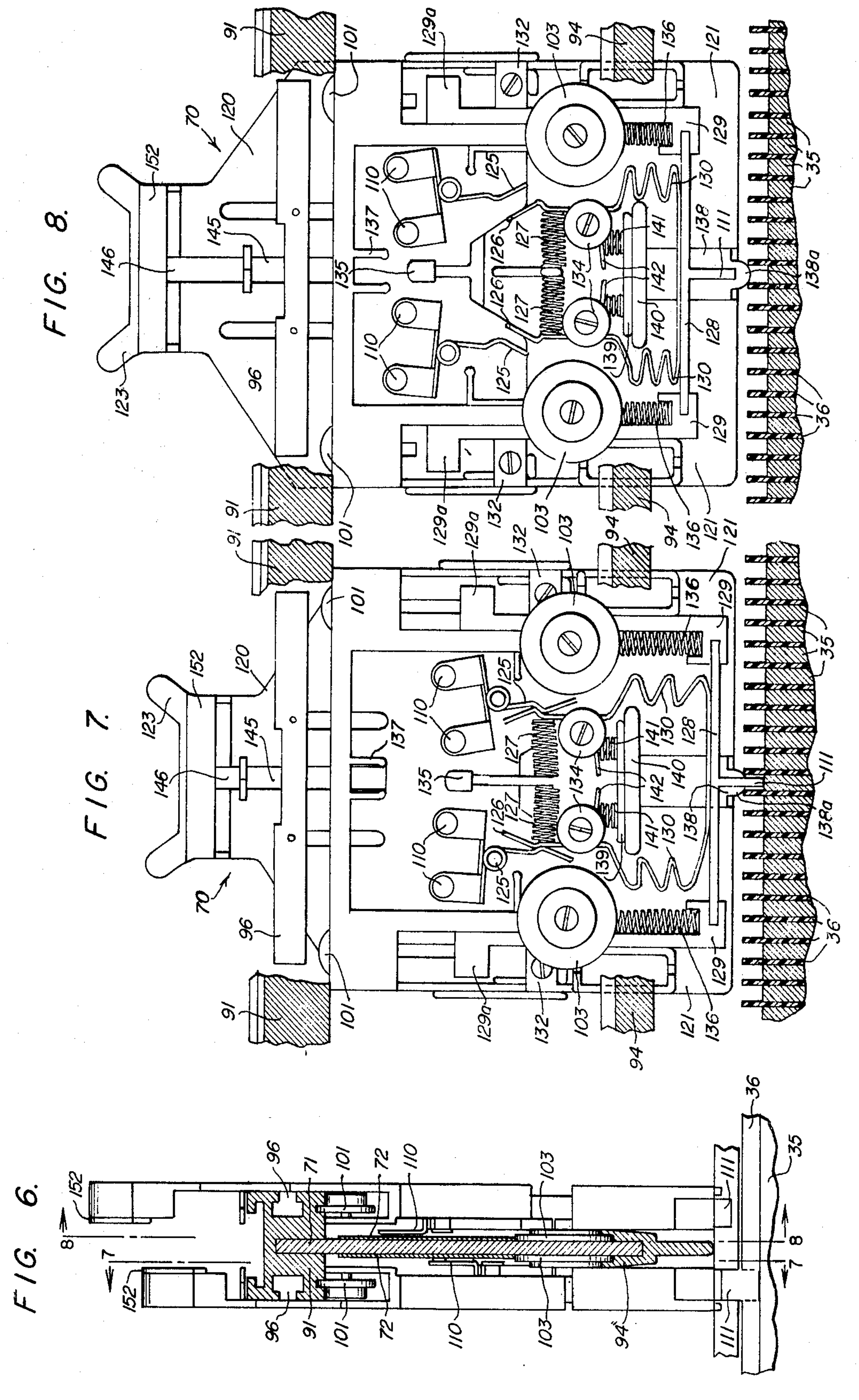
FIG. 6 is a view in cross section taken along the reference plane represented by the line 6—6 of FIg. 1, looking in the direction indicated by the arrows and shows the structure of a cross connect module of this invention.
FIG. 7 is a view in cross section taken along the reference plane represented by the line 7—7 of FIG. 6, looking in the direction indicated by the arrows and shows the internal structure of a sliding brush assembly of this invention in its closed circuit mode.
FIG. 8 is a view in cross section taken along the reference plane represented by the line 8—8 of FIG. 6, looking in the direction indicated by the arrows and shows the internal structure of a sliding brush assembly of this invention in its open circuit mode.

The transverse orientation of the individual cross connect modules 23 of the cross connect load section 21 with respect to the base supply section 20 is evident from FIGS. 1 and 3. FIGS. 5 and 6 show in greater detail the structural components of a preferred form of module, while FIGS. 7 and 8 and 9 illustrate the internal electrical and mechanical details of construction of sliding brush assemblies 70 carried by the modules 23.

The system illustrated associates each brush assembly 70 with a specific load circuit. Accordingly, the modules 23 may, for convenience, be referred to as load-connector modules. Each such module includes a thin, non-conductive center support member 71. As illustrated, thin member 71 is cut from a resin sheet material having a thin metallic surface cladding applied to each of its sides. The surface cladding is selectively removed, e.g., by etching techniques, leaving a conductive strip (load conductor) 72 on the middle portion of each side surface 73. Tabs 74, 75 project from the respective ends of the support member 71, and these tabs 74, 75 are received by slots 76 provided in first and second end supports 77, 78. Center support bosses 80 straddle the center support 71, and provide mechanical coupling of the center support 71 and end supports 77, 78. These members may be additionally fastened, e.g., with screws 81 and nuts 82 as shown.

An enlarged portion 84 of the slots 76 between the upper and lower bosses 80 accommodates a load conductor clip 85 which presses over a tab 74, 75 to contact a conductive strip 72. It should be noted that the strip 72 on the side 73 visible in FIG. 5 covers the tab 75 and extends substantially across the side 73, terminating sufficiently short of the side support 77 to remain out of contact with a clip 85 inserted through the access enlargement 84 in the side support 77 to straddle tab 74. The conductive strip 72 on the opposite side of the support 71 covers the tab 74 and terminates out of contact with the clip 85 associated with the opposite tab 75. Thus, each center panel 71 carries two load conductors 72 electrically isolated from each other. Each of the conductors 72 is associated with a separate sliding brush assembly 70 which functions completely independently so that each module 23 is capable of controlling two distinct load circuits.

Referring to FIG. 5, the top edge of the center support panel 71 is received by a slot 90 in a head frame member 91 and the bottom edge of the panel 71 is received by a slot 93 in a bottom frame member 94. The head frame member 91 is provided with grooves 95 on each side which receive bus bar indicator rails 96 associated with the brush assemblies 70. As is most evident from the visible portion of side support member 78 in FIG. 5, each side support 77, 78 carries a pair of head frame support bosses 98 which plug into the ends of the grooves 95. Similarly, the lower portion 94*a* of the bottom support member 94 is received between a pair of base support bosses 99 integral with each side support member 77, 78.

Each brush assembly 70 carries upper (head support) wheel guides 101 which are received in head frame-retaining grooves 102. Lower (base support) wheel guides 103 are similarly received by retaining grooves 104 defined between the center support 71 and the upper edges of the base support 94. The assemblies 70 may thus be moved transversely across the bus bars 35 with the wheels 101, 103 rolling within the tracks 102, 104 while being confined in the vertical and lateral directions.

As best shown by FIG. 6, brushes 110 carried by each assembly 70 maintain electrical contact with the conductive strips 72. Thus, when the main bus bar or breaker contact 111 carried by a brush assembly 70 is placed in contact with a selected bus bar 35 (see FIG. 7), the power source associated with that bus bar may be placed in electrical circuit through the brush contacts 110 with the conductor 72. This circuit may be opened by other structure internal the assembly 70 as explained hereinafter.

The internal structures of the brush assemblies 70 are apparent from FIGS. 7, 8 and 9, which show, respectively, an assembly 70 in closed, partially open and fully opened condition. Structurally, each assembly 70 includes an upper actuator, or handle section 120 and a lower or carriage section 121. These sections are best depicted in FIG. 5. The carriage section 121 includes the wheels 101, 102 and constitutes means for mounting the assembly 70 to the head frame 91 and base support 94. It also houses internal mechanical and electrical mechanism which will be described more fully hereinafter. The actuator section 120 includes a winged handle 123 for actuating the internal mechanisms and relocating the assembly 70 across the bus bars 35. Vertical upward displacement of the winged handle 123 cause the actuator section 120 and structure associated with it to move with respect to the carriage section and the structure associated with it. As a consequence, internal secondary load contacts 125 carried by the actuator section 120 are lifted away from the contacts 126 when the handle 123 is lifted to a partially open (FIG. 8) or fully open (FIG. 9) condition. The secondary load contacts 125 are held tightly against corresponding secondary source contacts 126 associated with the carriage section 121 when the handle 123 is in the closed (FIG. 7) condition. It should be noted that when the handle 123 is pushed down, the contacts 125 wipe across the contacts 126 which are biased towards the contacts 125 by compression springs 127. In this way, the arcing surfaces of the secondary breaker contacts 125, 126 are cleaned each time the handle 123 is either lifted or depressed. The brushes 110, secondary contacts 125, 126 and associated structure are retained in place by retaining washers 134.

The main contact 111 is integral with a conductive plate 128 fastened at opposite ends to lifter bars 129 and conductively connected to lower contacts 126 through flexible conductor leads 130. The lifter bars 129 are accommodated by slots 131 (FIG. 5) defined by structural elements of both the carriage 121 and actuator 120 sections, and are biased downward by compression springs 136 as shown, so that the contact 111 is held against a bus bar 35 by spring pressure when the handle 123 is in closed (FIG. 7) or partially open (FIG. 8) position. Thus, the contact 111 remains in closed circuit condition until after the secondary contacts 125, 126 are physically separated. Continued lifting of the handle 123 raises retainer bars 132 associated with the actuator section 120 to engage a portion 129*a* of the main contact lifters 129. The retainer bar structures serve also as connector elements to hold the actuator section 120 in slideable association with the carriage section 121. Upon engagement of the bars 132 with the lifter portions 129*a*, further lifting of the handle 123 raises the breaker contact 111 from the bus bar 35 (see FIG. 9). A latching boss 135 integral with the actuator section 120 is engaged by latching lugs 137 integral with the carriage section 121 to lock the actuator section 120 into fully open condition, as shown by FIG. 9.

As the main contact 111 is raised by the handle 123, the brushes 110 are also lifted up across the conductive strip 72. These strips 72 may, if desired, be dimensioned such that the brushes 110 ride up over the upper edge of the strip 72 to provide a third opening of the circuit. In any event, with the handle 123 lifted to fully open position (FIG. 9) the brush assembly 70 may be indexed by means of an indexing plunger 138 which is constantly biased downward to register a detent extension 138A in the groove formed between adjacent insulating strips 36. The indexing plunger 138 is integral with an indexing spring plate 139 and is held in slideable relationship by a retaining bar 140. Indexing springs 141 are compressed between the upper surface of the plate 139 and a suitable bearing surface which are, in illustrated instance, extensions 142 of the contacts 126. Contrary to the cross connect devices currently in use, indexing of the plunger 138 is to the specific bus bar 35 desired.

Figure 10:
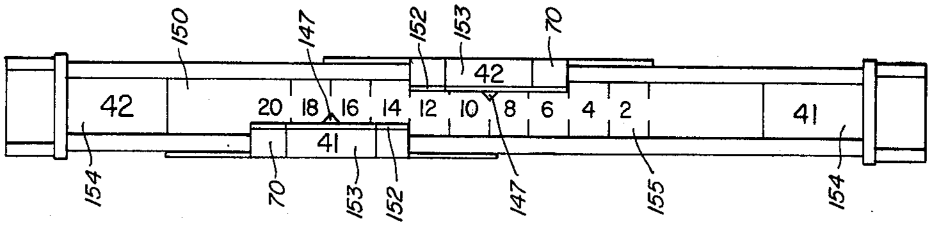
FIG. 10 is a top plan view showing the indicia system of the invention.

A particular advantage of the illustrated cross connect device is the indicia system cooperatively embodied in the head frame 91 and brush assemblies 70. Each brush assembly 70 carries a bus indicator rail 96 with an integral riser 145 slideably received in a slot 146 and terminating in a pointer 147 protruding out over the top of the head frame 91. The rail 96 is received by a groove 95 so that the pointer 147 is held just above the top surface of the head frame member 91, as best seen in FIG. 10. Indicia strips 150 of various types may be inserted in an indicator slot 151 (FIGS. 5, 10). A color-coded indicator plate 152 may be utilized, as shown, to identify a particular brush assembly 70 as to the type of circuit it controls. The pointers 147, or other structural components, may be color-coded in a similar fashion. An engraved identification plate 153 may be used to coordinate a specific brush assembly 70 with a specific load circuit. The load conductor 72 of that circuit may be similarly indicated by corresponding indicia 154 at the appropriate end of the head frame indicator slot 151. The bus bars 35 may also be assigned numbers or other identifying symbols which may be indicted on a bus bar indicator strip 155 located between the indicia 154. The pointers 147 indicate directly the bus bars 35 registered with the indexing plunger 138 (and thus the associated main contact 111) of each brush assembly 70. A handle 73 may be raised to engage the boss 135 and latching lugs 137 or depressed to disengage these components in "snap action" fashion without disturbing the indexing plunger 138 or the pointer 147.

Figure 11:
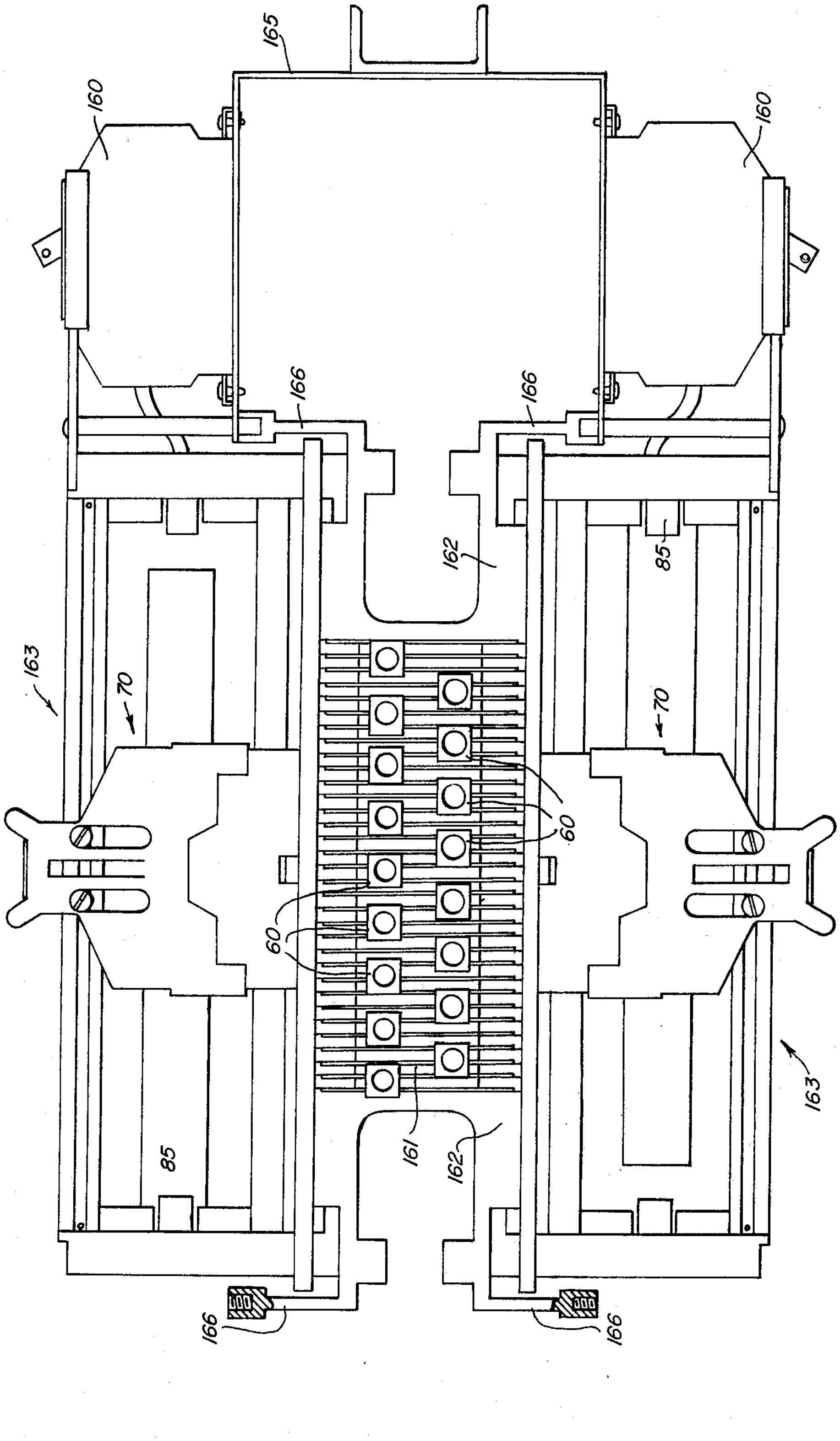
FIG. 11 is a view in side elevation illustrating circuit breaker mounting structure typically associated with this invention, the invention being illustrated embodied in an alternative form.

FIG. 11 illustrates one way in which the cross connect system may be interfaced with a number of load circuits protected with circuit breakers 160. As illustrated, a single base section 161 sandwiched between a pair of side support members 162 servies two cross connect sections 163. The circuit breakers 160 are mounted on support structure 165 anchored to outer wall elements 166 of the side supports 162 as shown. The breakers are shown at only one end of the cross connect modules, wired to the load connector clips 85 described hereinbefore. A similar array of breakers 160 will ordinarily be mounted at the opposite ends of the modules as well. Power supplies (not shown) may be connected to bus bar terminals 60 at both ends of the base supply section 161.

Reference herein to structural details of the illustrated embodiments is not intended to limit the scope of the appended claims which themselves recite the details regarded as essential to the invention.

I claim:

1. A cross-connect panel, comprising:

a base supply section having a pair of approximately parallel, side support members, each including a bottom element, an inner side wall upstanding from said bottom element, an elevated support element extending approximately normal from said inner side wall away from the other said side support member and an outer side wall upstanding from said elevated support element, said side support elements being spaced to form a channel between their respective inner side walls;

a plurality of bus bars arranged in approximately parallel spaced relationship within and in approximately longitudinal alignment with said channel;

a plurality of insulating strips interleaved with said bus bars to electrically isolate said bus bars from each other and said side support members;

means for restraining said bus bars from movement longitudinally in said channel;

means for restraining said bus bars from movement either up or down from said channel; and means for electrically connecting said bus bars individually to power supply means; and a cross-connect load section comprising a plurality of load-connector modules mounted in approximately parallel relationship transverse the bus bars on said elevated support elements each of said load-connector modules including:

a support member including at least one flat surface upstanding from and transverse said bus bars, said surface carrying a thin conductive strip electrically isolated from said bus bars, and including means for connecting said conductive strip to an external load circuit; and a brush assembly mounted to slide along said support member parallel said surface, and including:

a brush contact mounted in slideable engagement with said conductive strip, and a main bus bar contact operable for selective engagement with a selected of said plurality of bus bars in circuit with said brush contact to selectively make or break an electrical circuit between said bus bar and said conductive strip.

2. A cross-connect panel according to claim 1 wherein each said load-connector module includes a pair of brush assemblies mounted adjacent respective flat surfaces on opposite sides of said support member with brush contacts in slideable engagement with respective thin conductive strips electrically isolated from each other by said support member.

3. A cross-connect panel according to claim 2 wherein the outer side wall of each of the approximately parallel side support members of the base supply section carries means for connecting circuit breaker support structure with individual circuit breakers which may be mounted in juxtaposed relationship with said load-connector modules.

4. A cross connect panel according to claim 3 including first circuit breakers mounted along a first said outer side wall with one such first circuit breaker juxtaposed with each said module and electrically connected to one of said conductive strips carried by said module and second circuit breakers mounted along the other said outer side wall with one such second circuit breaker juxtaposed with each said module opposite a corresponding first circuit breaker and electrically connected to the other said conductive strip.

5. A cross connect panel according to claim 1 wherein each load connector module includes a head frame member having means to slideably engage and support said brush assembly.

6. A cross connect panel according to claim 5 wherein said head frame member carries indicia means correlated to the location of individual bus bars, and said brush assembly carries indicator means to coact with said indicia means to indicate the precise location of said main bus bar contact with respect to the individual bus bars.

7. A cross connect panel according to claim 6 wherein said indicator means includes a pointer extending from a rail and said rail is received by a slot in said head frame member in slideable relation so that the pointer is free to move across the head frame member but is held directly above the upper surface of said head frame member to register with said indicia.

8. A cross connect panel according to claim 1 wherein said means for electrically connecting a said bus bar individually to power supply means includes a bus terminal integral with a swage fit extension pressed into a corresponding receptacle provided near an end of said bus bar.

9. A cross connect panel according to claim 1 wherein said means for restraining said bus bars from movement longitudinally in said channel comprises: (1) locking elements configurated to rest upon the edges of individual said bus bars adjacent a common end of said bus bars between adjacent insulating strips to register in locking relationship with said individual bus bars; and (2) a restraining element positioned proximate said locking elements to secure said locking elements in place and to anchor said side support members.

10. A load-connector module for a cross-connect panel, comprising:

a non-conductive center support member of thin cross section and relatively large length and width dimensions;

first and second end supports, each mechanically coupled to a respective end of said center support member, carrying means for connection to a base supply module and providing means of access to the end of said center support member to which it is coupled;

a head frame member mechanically coupled to both said end supports and to said center support members and including first and second head frame guide means aligned approximately longitudinally and parallel with respect to respective opposite sides of the upper portion of said center support member;

a base frame member mechanically coupled to both said end supports and to said center support member and including first and second base frame guide means aligned approximately longitudinally and parallel with respect to respective opposite sides of the lower portion of said center support member;

a first metallic surface cladding on one side of said central support member in its middle portion extending from said first end support in the vicinity of said means of access substantially the entire length of said central support member and in approximately longitudinal alignment therewith, terminating a short distance removed from said second end support;

a second metallic surface cladding on the opposite side of said central support member than the first metallic surface cladding but in a corresponding middle portion except extending from said second end support and terminating a short distance removed from said first end support;

a first sliding brush assembly with upper brush assembly guide means coupled with said first head frame guide means and lower brush assembly guide means coupled with said first base frame guide means so that said sliding brush assembly can be moved across substantially the entire width of said center support member, carrying brush means arranged to make electrical contact with said first metallic surface cladding and further carrying bus bar contact means arranged to make electrical contact with bus bars of a base supply module arranged transverse and below said center support member; and a second sliding brush assembly similar to said first sliding brush assembly with upper brush assembly guide means coupled to said second head frame guide means and lower brush assembly guide means coupled to said second base frame guide means and carrying brush means arranged to make electrical contact with said second metallic surface cladding.

11. A load-connector module according to claim 10 wherein said head frame member carries indicia means correlated to the location of individual bus bars, and said first and second brush assemblies each carry indicator means to coact with said indicia means to indicate the precise location of said main bus bar contact with respect to the individual bus bars.

12. A load-connector module according to claim 11 wherein said brush assembly indicator means each include a pointer extending from a rail and said rails are received by slots in opposite sides of said head frame member in slideable relation so that the pointers are free to move across the head frame member but are held directly above the upper surface of said head frame member to register with said indicia.

13. A load-connector module according to claim 10 wherein each of said first and second sliding brush assemblies comprises:

a carriage section including said upper and lower brush assembly guide means coupled with said head frame and base frame guide means and carrying first internal secondary source contacts;

an actuator section, slideably attached to said carriage section, including:

handle means for selectively raising or lowering said actuator section with respect to said carriage section, brush contacts in slideable engagement with said load conductor when said actuator section is lowered, and second internal secondary source contact points arranged to engage said first secondary contact points when said actuator section is lowered but disengage said first points when said actuator section is raised; and said main bus bar contact connected through said secondary source contact points to said brush contacts and mounted to be lifted away from or pressed into contact with a selected bus bar in response to raising or lowering of said actuator section.

14. A load-connector module according to claim 13 wherein said main bus bar contact is mounted on lifter means slideably mounted to said carrier section and loosely coupled to said actuator section so that as said actuator section is raised, said main bus bar contact remains positioned down against a bus bar until after said first and second secondary source contact point are disengaged.

15. A load-connector module according to claim 14 wherein said head frame member carries indicia means correlated to the location of individual bus bars, and said first and second brush assemblies each carry indicator means to coact with said indicia means to indicate the precise location of said main bus bar contact with respect to the individual bus bars.

16. A load-connector module according to claim 15 wherein said brush assembly indicator means each include a pointer extending from a rail and said rails are received by slots in opposite sides of said head frame member in slideable relation so that the pointers are free to move across the head frame member but are held directly above the upper surface of said head frame member to register with said indicia.

17. A load-connector module according to claim 14 wherein said brush contacts carried by a said actuator section are raised up across and above said conductive strip when said main bus bar contact is lifted up out of contact with a said bus bar so that said circuit is broken at the bus bar, the secondary source contacts and the brush contacts when the actuator section is fully raised.

18. A load-connector module according to claim 14 wherein said carriage section and said actuator section have engagement means for releasably holding said actuator section in raised position, thereby holding said bus bar contact out of contact with said bus bars.

19. A load-connector module according to claim 14 wherein said sliding brush assemblies each include means for normally biasing said main bus bar contact toward said bus bars.

20. A base supply section for a cross-connect panel, comprising:

a pair of approximately parallel, side support members, each including a bottom element, an inner side wall upstanding from said bottom element, an elevated support element extending approximately normal from said inner side wall away from the other said side support member and an outer side wall upstanding from said elevated support element, said side support elements being spaced to form a channel between their respective inner side walls;

a plurality of bus bars arranged in approximately parallel spaced relationship within and in approximately longitudinal alignment with said channel;

a plurality of insulating strips interleaved with said bus bars to electrically isolate said buses from each other and said side support members;

means for restraining said bus bars from movement longitudinally in said channel;

means for restraining said bus bars from movement either up or down from said channel; and means for electrically connecting said bus bars individually to power supply means.

21. A base supply section in accordance with claim 20 wherein said means for restraining said bus bars from movement longitudinally in said channel comprises: (1) locking elements configurated to rest upon the edges of individual said bus bars adjacent a common end of said bus bars between adjacent insulating strips to register in locking relationship with said individual bus bars; and (2) a restraining element positioned proximate said locking elements to secure said locking elements in place and to anchor said side support members.

22. A base supply section according to claim 20 wherein each said bus bar includes a receptacle opening near one end and a swage fit extension of a bus bar connector is pressed into said receptacle opening of each said bus bar so that bus bar connectors extend from each said bus bar in direct physical and electrical contact therewith.

23. A sliding brush assembly for a load-connector module of a cross-connect panel wherein said panel includes a plurality of mutually electrically isolated bus bars mounted in approximately parallel, spaced side by side relationship and said module includes support structure and a load conductor, both held approximately transverse said bus bars in a space defined by parallel planes approximately normal said bus bars, comprising:

a carriage section including:

mounting means for holding said carriage section in slideable relationship with said support structure parallel said load conductor, and first internal secondary source contact points;

an actuator section, slideably attached to said carriage section, including:

handle means for selectively raising or lowering said actuator section with respect to said carriage section, brush contacts in slideable engagement with said load conductor when said actuator section is lowered, and second internal secondary source contact points arranged to engage said first secondary contact points when said actuator section is lowered but disengage said first points when said actuator section is raised; and a main bus bar contact connected through said secondary source contact points to said brush contacts and mounted to be lifted away from or pressed into contact with a selected bus bar in response to raising or lowering of said actuator section.

24. A sliding brush assembly according to claim 23 wherein said bus bar contact is mounted on lifter means slideably mounted to said carrier section and loosely coupled to said actuator section so that as said actuator section is raised, said main bus bar contact remains positioned down against a bus bar until after said first and second secondary source contact points are disengaged.

25. A sliding brush assembly according to claim 24 wherein said brush contacts carried by said actuator section are raised up across and above said conductive strip when said main bus bar contact is lifted up out of contact with a said bus bar so that said circuit is broken at the bus bar, the secondary source contacts and the brush contacts when the actuator section is fully raised.

26. A sliding brush assembly according to claim 24 wherein said carriage section and said actuator section have engagement means for releasably holding said actuator section in raised position, thereby holding said bus bar contact out of contact with said bus bars.

27. A sliding brush assembly according to claim 24 wherein said sliding brush assemblies each include means for normally biasing said main bus bar contact toward said bus bars.

* * * * *